C. ROSE.
HORSESHOE.
APPLICATION FILED APR. 13, 1912.
1,035,051.
Patented Aug. 6, 1912.
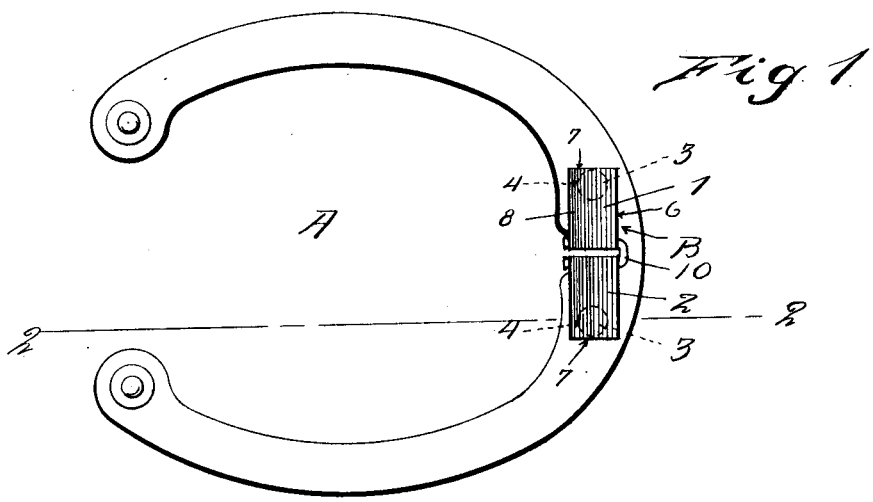
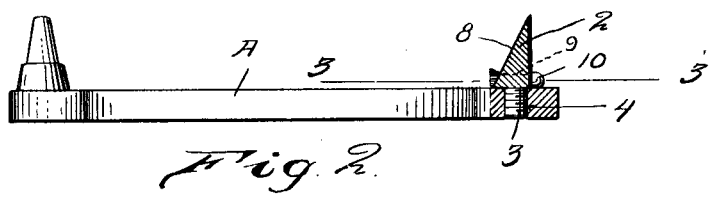
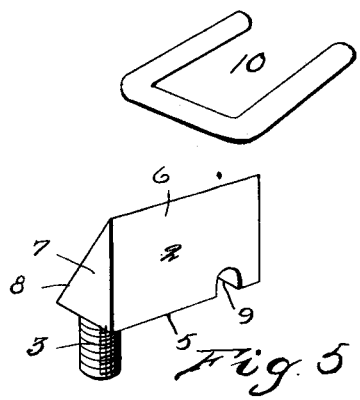
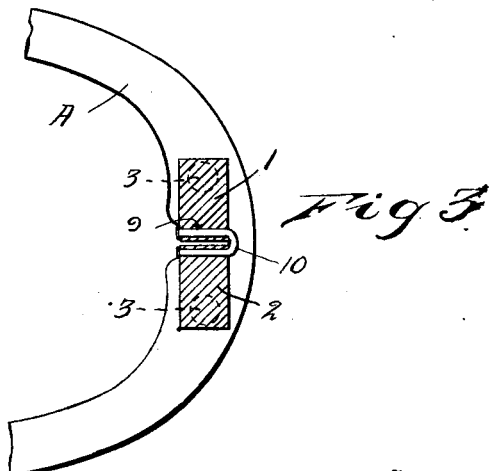

UNITED STATES PATENT OFFICE.

CLARENCE ROSE, OF CHAMBERLAIN, SOUTH DAKOTA.

HORSESHOE.

1,035,051. Specification of Letters Patent. Patented Aug. 6, 1912.

Application filed April 13, 1912. Serial No. 690,532.

*To all whom it may concern:*

Be it known that I, CLARENCE ROSE, a citizen of the United States, residing at Chamberlain, in the county of Brule and State of South Dakota, have invented certain new and useful Improvements in Horseshoes, of which the following is a specification.

This invention relates to horseshoes, and particularly to horseshoes which have removable toe-calks.

The object of this invention is to provide a toe-calk in two parts which may be easily and quickly attached and replaced when worn.

An important object is to provide a toe-calk in two parts removably attached to a horseshoe, said separate parts of the calk being secured together to prevent the calks from turning.

A further object is to provide a device of this character which will be simple in operation, capable of sustaining any ordinary strain to which it would be subjected and which will be inexpensive to manufacture.

With these and other objects in view, my invention consists in the novel construction and arrangement of parts as fully set forth in the following description.

Referring to the drawings forming a part of this specification and in which like numerals are used to designate corresponding parts in the several views, Figure 1 is an inverted plan view of a horseshoe provided with my improved toe-calk, Fig. 2 is a sectional view thereof on the line 2—2 of Fig. 1, Fig. 3 is a horizontal section on the line 3—3 of Fig. 2, Fig. 4 is a perspective view of the improved securing means for preventing the calks from turning, and Fig. 5 is a perspective view of one of the calks.

Referring more particularly to the drawings, A designates a horseshoe. For purposes of illustration I have shown this horseshoe as being of a type well known to the trade generally, the only difference being that I have substituted my toe-calk for the one commonly provided on such shoes.

B indicates my improved toe-calk as a whole, which comprises the sections 1 and 2. Each of the sections 1 and 2 is provided near its outer end with a lug or shank 3 adapted to be inserted within openings 4 formed through the shoe 1. The shanks and openings are preferably screw threaded, though if desired the shanks may be driven or riveted into the holes to secure the calks to the shoe.

The calk sections comprise rectangular base portions 5, vertical front and end walls 6 and 7, and inclined rear walls 8. The calk sections are provided near their adjacent ends with holes 9 adapted to receive a U-shaped securing staple 10.

In applying my improved calks to a shoe, the shanks 3 of the calk sections are screwed into the holes 4 until the base portions 5 bear against the surface of the shoe. The securing staple 10 is then passed through the holes 9, and its inner projecting ends riveted or flattened to retain it in place. It will be seen that this positively prevents the calk sections from turning and becoming loosened. When the calks become worn, and it is desired to replace them, the U-shaped staple is cut and the calks are unscrewed from the threaded holes.

Owing to the fact that the shanks of the calks are placed near their extreme outer ends, it will be apparent that any strain upon said ends will not have any appreciable leverage to turn the calks. It is also apparent that the securing staple positively holds the inner ends of the calks against rotation or displacement.

It will be seen that this calk does not involve much expense in its manufacture and application, as there are no holes, keyways, recesses, etc., needed to secure the calk in place, with the exception of course of the two screw threaded holes which are normally provided in horseshoes of this character and the holes in the calks.

Having thus described my invention what I claim is:—

1. In combination with a horseshoe having holes extending therethrough at its toe portion, a detachable toe calk comprising two similar sections, each section of which is wedge-shaped in cross section, a depending shank upon each of said sections disposed in close proximity to the outer edges of said calk sections and adapted to be engaged within the holes in the shoe, each of said calk sections being further provided with a hole extending transversely therethrough adjacent its inner end, and a U-shaped locking member having its arms disposed within said transverse openings in the calk.

2. In combination with a horseshoe provided with a two section detachable toe-calk, locking means comprising a body portion and angularly extending arms to engage holes provided at the inner adjacent ends of said calk sections for preventing the turning of said calk sections.

In testimony whereof I hereto affix my signature in the presence of two witnesses.

CLARENCE ROSE.

Witnesses:
M. E. House,
J. E. House.

Copies of this patent may be obtained for five cents each, by addressing the "Commissioner of Patents, Washington, D. C."